(12) United States Patent  (10) Patent No.: US 7,853,403 B2
Tanaka  (45) Date of Patent: Dec. 14, 2010

(54) VEHICLE NAVIGATION SYSTEM

(75) Inventor: Hiroshi Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 12/071,408

(22) Filed: Feb. 21, 2008

(65) Prior Publication Data

US 2008/0208462 A1 Aug. 28, 2008

(30) Foreign Application Priority Data

Feb. 26, 2007 (JP) ............... 2007-45552

(51) Int. Cl.
G08G 17/137 (2006.01)
G01S 5/14 (2006.01)
G01C 21/26 (2006.01)
G01C 21/00 (2006.01)

(52) U.S. Cl. .......... 701/209; 701/25; 701/28; 701/117; 701/201; 701/207; 701/210; 701/211; 701/213; 345/440; 345/440.2; 345/173; 340/988; 340/995.1; 340/995.13; 715/700; 715/716; 342/357.01; 342/357.06

(58) Field of Classification Search ............... 701/200, 701/202, 206, 207, 208, 209, 210, 211, 212, 701/213, 300; 340/990, 995.1, 995.12, 995.13, 340/995.14, 995.15, 995.16, 995.19, 995.24
See application file for complete search history.

(56) References Cited

U.S. PATENT DOCUMENTS 5,757,289 A * 5/1998 Nimura et al. ......... 340/995.21
5,787,383 A * 7/1998 Moroto et al. ............ 701/210
5,802,492 A * 9/1998 DeLorme et al. ......... 455/456.5
5,848,373 A * 12/1998 DeLorme et al. ............ 701/200
5,887,269 A * 3/1999 Brunts et al. ............... 701/208

6,009,403 A * 12/1999 Sato ............................. 705/6

(Continued)

FOREIGN PATENT DOCUMENTS

JP   A-10-30932   2/1989

(Continued)

OTHER PUBLICATIONS

Office Action mailed Jan. 27, 2009 in corresponding Japanese patent application No. 2007-045552 (and English translation).

(Continued)

Primary Examiner—Jack Keith
Assistant Examiner—Jonathan M Dager
(74) Attorney, Agent, or Firm—Posz Law Group, PLC

(57) ABSTRACT

A navigation system for a vehicle for generating a plurality of routes from a present position of the vehicle to a destination acquires the present position. The system stores map data of a map and storing position detection data. The system displays the map based on the map data. The system forms a factor chart of each of the plurality of routes and the associated one or more factors. The system causes the factor chart of the associated one or more factors of the each of the plurality of routes to be displayed. The system searches for at least one facility located along the each of the plurality of routes based on the position detection data. The system causes the at least one facility to be displayed together with the chart of the associated factor.

14 Claims, 12 Drawing Sheets

U.S. PATENT DOCUMENTS

| | | | | |
|---|---|---|---|---|
| 6,049,753 | A * | 4/2000 | Nimura | 701/201 |
| 6,175,800 | B1 * | 1/2001 | Mori et al. | 701/202 |
| 6,266,610 | B1 * | 7/2001 | Schultz et al. | 701/201 |
| 6,278,941 | B1 * | 8/2001 | Yokoyama | 701/209 |
| 6,617,980 | B2 * | 9/2003 | Endo et al. | 340/905 |
| 6,864,807 | B2 * | 3/2005 | Todoriki et al. | 340/988 |
| 2003/0018427 | A1 * | 1/2003 | Yokota et al. | 701/208 |
| 2003/0130789 | A1 * | 7/2003 | McDonough | 701/209 |
| 2003/0163333 | A1 * | 8/2003 | Podgurny et al. | 705/1 |
| 2003/0182052 | A1 * | 9/2003 | DeLorme et al. | 701/201 |
| 2003/0208316 | A1 * | 11/2003 | Endo et al. | 701/211 |
| 2004/0102899 | A1 * | 5/2004 | Kaji et al. | 701/210 |
| 2004/0204845 | A1 * | 10/2004 | Wong | 701/210 |
| 2004/0249568 | A1 * | 12/2004 | Endo et al. | 701/209 |
| 2005/0043880 | A1 * | 2/2005 | Yamane et al. | 701/200 |
| 2005/0073443 | A1 * | 4/2005 | Sheha et al. | 340/995.1 |
| 2006/0025925 | A1 * | 2/2006 | Fushiki et al. | 701/210 |
| 2006/0074553 | A1 * | 4/2006 | Foo et al. | 701/212 |
| 2006/0097986 | A1 * | 5/2006 | Mizuno | 345/156 |
| 2006/0253247 | A1 * | 11/2006 | de Silva et al. | 701/201 |
| 2007/0038362 | A1 * | 2/2007 | Gueziec | 701/117 |
| 2007/0150174 | A1 * | 6/2007 | Seymour et al. | 701/200 |
| 2008/0109153 | A1 * | 5/2008 | Gueziec | 701/117 |
| 2008/0195313 | A1 * | 8/2008 | Coleman | 701/210 |
| 2008/0262717 | A1 * | 10/2008 | Ettinger | 701/206 |
| 2009/0005974 | A1 * | 1/2009 | Lenneman et al. | 701/209 |
| 2009/0037100 | A1 * | 2/2009 | Fujiwara et al. | 701/209 |

FOREIGN PATENT DOCUMENTS

| | | |
|---|---|---|
| JP | A-01-130299 | 5/1989 |
| JP | A-05-164566 | 6/1993 |
| JP | A-10-030931 | 2/1998 |
| JP | A-2002-202137 | 7/2002 |
| JP | A-2003-232648 | 8/2003 |
| JP | A-2004-069561 | 3/2004 |
| JP | A-2004-233711 | 8/2004 |
| JP | A-2004-286455 | 10/2004 |
| JP | A-2005-055201 | 3/2005 |
| JP | A-2006-184126 | 7/2006 |
| JP | A-2006-267079 | 10/2006 |

OTHER PUBLICATIONS

Office Action mailed Aug. 25, 2009 in corresponding Japanese patent application No. 2007-045552 (and English translation).

* cited by examiner

F1

VEHICLE NAVIGATION SYSTEM

CROSS REFERENCE TO RELATED APPLICATION

This application is based on and incorporates herein by reference Japanese Patent Application No. 2007-45552 filed on Feb. 26, 2007.

BACKGROUND OF THE INVENTION

1. Field of the Invention

The present invention is related with a vehicle navigation system which can search for generating multiple routes from an original position to a destination.

2. Description of the Related Art

A conventional vehicle navigation system generates multiple routes from an original position, such as a present position, to a destination when the, destination is determined, and the multiple routes are displayed on a map in the display device. Also, the conventional vehicle navigation system allows the user to select a preferred route among the multiple routes as a guidance route (see JP-A-2002-202137). In the above system, a guidance route is selected based on a condition, such as a street name, the fee of toll road or turnpike toll, a required time. For example, in a case, where the street name is used for the selection, when a street name key is operated, the names of highways will be displayed in a list on a display device. When the user selects a preferred street name in the list, the route including the road of the selected name is highlighted. When a determination key is operated in the above situation, the highlighted route is confirmed as final and determined as the guidance route.

Another conventional system search for a route associated with a shortest distance and a route associated with a shortest required time from the present position to the destination when the destination is set up, and both the routes are displayed on the display device. When the user selects one of the routes, which are displayed, the system confirmed the selected route as the guidance route (refer to JP-A-H1-130299).

Further, another conventional vehicle navigation system generates multiple routes with a rank order in consideration of minimizing the cost of the line segments from the original position to the destination. The system displays the multiple routes on the map in display device to facilitate the visual recognition and allows the user to select a preferred route (JP-A-H5-164566).

In each system described in JP-A-2002-202137, JP-A-H1-130299, and JP-A-H5-164566, the generated or calculated multiple routes are simultaneously displayed in the display device. However, because each route usually includes curves that bend vertically and horizontally in the display, it is difficult to compare lengths of distance of the multiple routes based on the appearance of the routes. For the above reason, when selecting one route among the multiple routes, the lengths of the distances cannot be easily compared with each other even when the distance is necessary as a criteria for the selection.

In the vehicle navigation system of JP-A-2002-202137, when the required time is used for the selection, the route having the shortest required time among multiple searched routes or calculated routes displayed on the display device is highlighted. For example, the route to take less than 20 minutes, the route to take less than 25 minutes, the route to take less than 30 minutes, the route to take less than 35 minutes, and the route to take less than 40 minutes are displayed in a list. However, for example, when there are two routes, both of which take more than 20 minutes but equal to or less than 25 minutes, the route taking the shorter required time than the other cannot be distinguished from the other.

SUMMARY OF THE INVENTION

The present invention is made in view of the above disadvantages. Thus, it is an objective of the present invention to address at least one of the above disadvantages.

To achieve the objective of the present invention, there is provided a navigation system for a vehicle for generating a plurality of routes from a present position of the vehicle to a destination, the navigation system including present position acquiring means, information storage means, display means, factor chart display controlling means, facility search means, and facility display controlling means. The present position acquiring means acquires the present position. The information storage means stores map data of a map and storing position detection data including a relation between a type of each of various facilities and a facility position of the each of the various facilities on the map. The display means displays the map based on the map data. The factor chart display controlling means associates one or more factors with each of the plurality of routes and forms a factor chart of the route and the associated one or more factors. The factor chart display controlling means causes the display means to display the factor chart of the associated one or more factors of the each of the plurality of routes. The facility search means searches for at least one facility located along the each of the plurality of routes based on the position detection data. The facility display controlling means causes the display means to display the at least one facility for the each of the plurality of routes together with the factor chart of the associated one or more factor.

BRIEF DESCRIPTION OF THE DRAWINGS

The invention, together with additional objectives, features and advantages thereof, will be best understood from the following description, the appended claims and the accompanying drawings in which:

DESCRIPTION OF EXEMPLARY EMBODIMENTS

Figure 15:
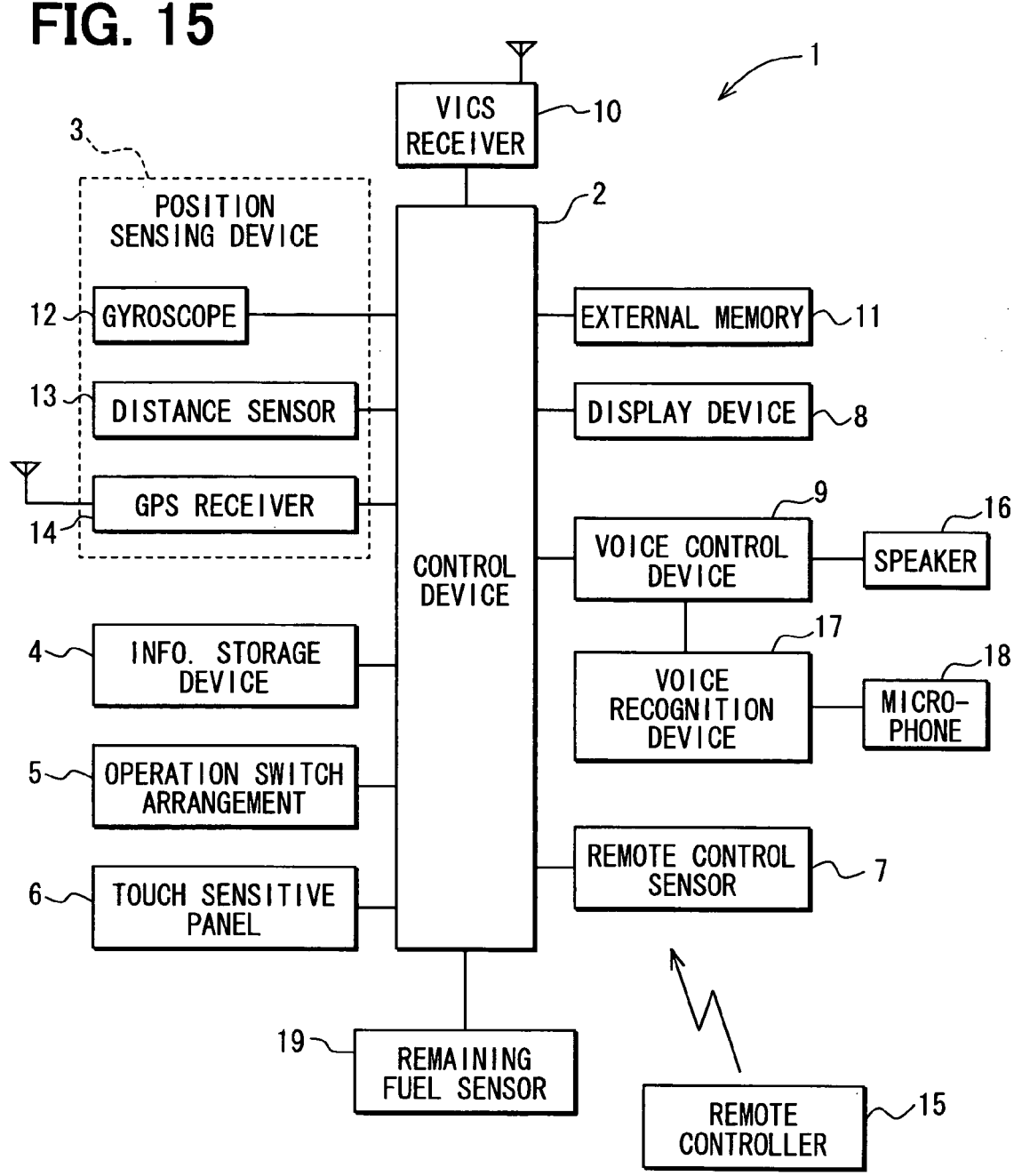
FIG. 15 is a block diagram illustrating an exemplary electric structure of the vehicle navigation system.

One embodiment of the present invention is described with reference to accompanying drawings. FIG. 15 is a block diagram that shows an electric structure of a vehicle navigation system 1. As shown in FIG. 15, the vehicle navigation system 1 includes components, such as a control device 2, a position sensing device 3, a information storage device 4, an operation switch arrangement 5, a touch sensitive panel 6, a remote control sensor 7, a display device 8, a voice control device 9, a vehicle information communication system (VICS) receiver 10, and an external memory 11. The vehicle navigation system 1 is connected with the above components. The control device 2 serves as control means, and the position sensing device 3 serves as present position acquiring means. The information storage device 4 serves as information storage means. The display device 8 serves as display means, and The VICS receiver 10 serves as road information acquiring means.

The control device 2 controls general operations of the vehicle navigation system 1 and mainly includes a microcomputer. That is, the control device 2 includes a CPU, a ROM, a RAM, an I/O, and a bus (all not shown). The bus connects the above components. The ROM stores the program for displaying a map for the vehicle navigation system 1, the program for route search or route calculation, the program for route guidance, the program for VICS information processing, etc. The RAM temporarily stores temporary data during program execution and temporarily stores map data acquired from the information storage device 4.

Position sensing device 3 includes a gyroscope 12, a distance sensor 13, a global positioning system (GPS) receiver 14. The above sensors 12-14 may have detection errors, which are different from each other in characteristic. A position can be detected with high accuracy by amending each of the detection errors when the above sensors 12-14 are combined. All of the sensors 12-14 are not always needed depending on the demanded level of a detecting accuracy. As a result, the sensors 12-14 are selectively employed as required. The position sensing device 3 may include a rotation sensor of a steering wheel and a wheel sensor, which detects a rotation of each driving wheel or tire.

The information storage device 4 includes an information recording media, such as DVD-ROM, and a reader which reads data in the information recording medium, for example. Thus, the reader reads the data in the information recording medium and inputs the data to the control device 2. The information storage device 4 stores the data, such as map data, data for map matching, data for guiding the route with a sound, position detection data for searching for the position on map based on addresses, genre data for searching for destinations in each genre, turnpike toll data.

The display device 8 includes a full color liquid crystal display device in which map data, characters, symbols, or graphics can be displayed. The operation switch arrangement 5, the touch sensitive panel 6, and the remote controller 15, which makes a pair with the remote control sensor 7, serve as input means for allowing a user to input data, to set matters, or to perform the various inputs for a destination setup. The operation switch arrangement 5 includes a push button switch provided around a display screen, such as a liquid crystal display, of the display device 8, for example. Also, the touch sensitive panel 6 is formed to be transparent and is attached to the surface of the display screen of the display device 8.

The voice control device 9 is connected with a speaker 16 and a voice recognition device 17. Further, a microphone 18 serving as input means is connected to the voice recognition device 17. And the microphone 18 changes a sound made by the user into an audio signal and gives the signal to the voice recognition device 17. The voice recognition device 17 recognizes the command, which is delivered by the user via the sound, based on the audio signal, and sends the command to the voice control device 9. The voice control device 9 sends the recognized command to the control device 2 such that processing of the command is performed by the control device 2.

The control device 2 has a function of the display controlling means and calculates the present position of the vehicle based on the information inputted by the position sensing device 3. Then, based on map data acquired from the information storage device 4, the control device 2 causes the display device 8 to display the road map around the present position in the display screen of the display device 8. Also, the control device 2 superimposes a pointer which shows the present position and the travel direction of the vehicle, on the displayed road map. The scale factor of the road map displayed on the display screen can be changed by the operation of the operation means.

The control device 2 has the search function of searching for the route to the destination, and the travel-guidance function of instructing the direction, in which the vehicle is to travel, based on the searched route. In other words, when the operation switch arrangement 5, the touch sensitive panel 6, or the remote controller 15 is operated to determine the destination, routes from the original position, which is usually the present position, to the destination are searched for or calculated under each of the multiple conditions. The routes searched for under the multiple conditions are shown on the map in the display screen of the display device 8 with different colors. Dijkstra method is used as the method for searching or calculating the route.

When one route is selected as the guidance route among the multiple searched routes, the selected guidance route is highlighted on the road map displayed on the display screen of the display device 8 by a color different from the usual road color. In order that the control device 2 instruct the travel direction of the vehicle based on the guidance route, the control device 2 causes the display device 8 and to display an enlarged crossing etc. in the display screen of display device 8 to show the travel direction as an arrow. Also, the control device 2 uses the voice control device 9 to output the sound through the speaker 16 for guiding the travel direction.

The map data stored in the information storage device 4 is data for displaying map in the display screen of the display device 8 and includes link information, node information, etc. The above data configuration is formed based on the following concept for forming a map. In order to form a map, roads on the map are divided by nodes into multiple parts. Each of the nodes shows a crossing, a turning point, a juncture, or a bending point of a curve having more than a predetermined angle. Then, a part between the nodes is defined as a link. Then, by connecting the links, the map is formed.

The above link information includes property data items for each link, such as a unique ID of the link, a link length (road length) showing the length of the link, coordinates of the start and the termination of the link, a width of a road corresponding to the link, a road type such as a national highway, a prefectural road, a municipal road, a toll road, or the like, of the road corresponding to the link. The above node information includes data items for each node, such as a unique ID for the node, the coordinates of the node, node property such as data indicating an intersection or a multi-lane crossing.

When the position such as the original position, a position on the way to the destination, or the destination, is specified by a certain item such as the address, a building name, the facility name, a crossing name, a telephone number, or the like, the position detection data of the information storage device 4 is used in order to search for the position. The position detection data is constituted as map index data which includes coordinates on the map, each of which is associated with the address, the building name, the facility name, the crossing name, the telephone number, etc. The turnpike toll data is prepared such that the toll between the interchanges of toll roads can be searched for, and therefore it is possible to search the fee of the toll road between any entrance interchange and any exit interchange.

Figure 10:
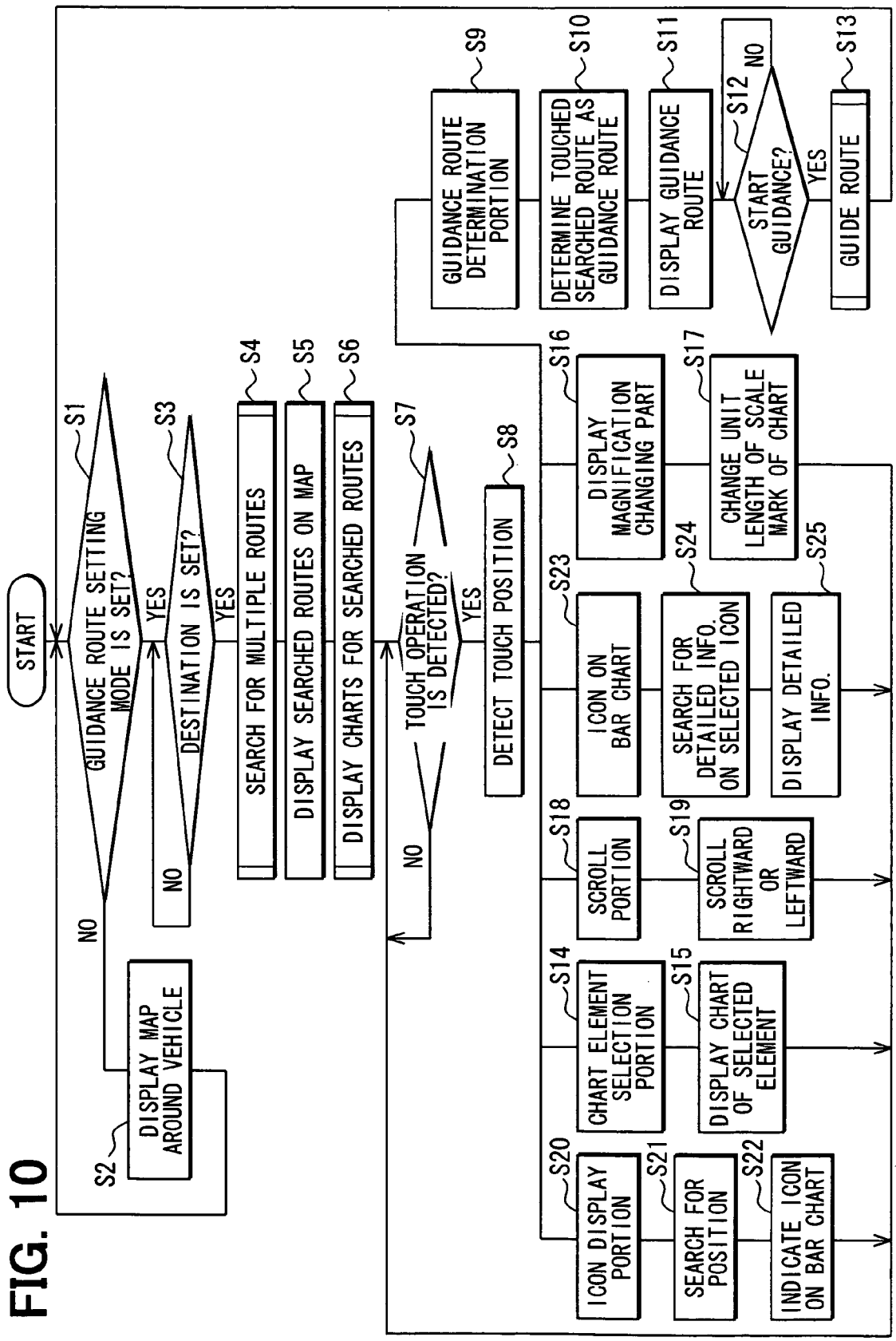
FIG. 10 is a flow chart illustrating exemplary guidance route determination.

The operation of the vehicle navigation system 1 of the above structure is explained referring to a flow chart shown in FIG. 10. First, the control device 2 usually calculates the present position of the vehicle based on the information inputted from the position sensing device 3. Then, the control device 2 displays the road map around the present position on the display screen of the display device 8 based on the map data acquired from the information storage device 4. Also, the control device 2 superimposes the pointer which shows the present position and the travel direction of the vehicle on the road map in the display screen, corresponding to NO at S1, and control repeats S2 in FIG. 10 correspondingly to the map display controlling means.

When the input means such as the operation switch arrangement 5, the touch sensitive panel 6, or the like, sets the vehicle navigation system 1 in the guidance route setting mode, corresponding to YES at S1, the control device 2 waits for the set up of the destination at S3. When the user operates the input means, such as by using the touch sensitive panel 6 to set up the destination, the control device 2 searches for multiple routes based on multiple conditions at S4, which can be performed by the route search means.

Five routes such as a recommendation route, a most-use-of-toll-road route, a most-use-of-ordinary-street route, a shortest-distance route and an alternative route are searched for based on the multiple conditions. The most-use-of-toll-road route is determined in the following manner. First, three routes that use toll roads are searched for. Then, the one having a median distance among the three routes is selected as the most-use-of-toll-road route. That is, the one having the second longest distance among the three routes is selected. The recommendation route corresponds to the shortest distance route among the above three routes which use the toll roads. The alternative route corresponds to the longest distance route among the above three routes which use the toll roads. The most-use-of-ordinary-street route corresponds to a route which avoids taking the toll road but employs national highways and prefectural roads most often. The shortest distance route corresponds to a route, which has a shortest distance, and which includes roads that are not limited to the toll road, the national highway, or the prefectural road.

Figure 11:
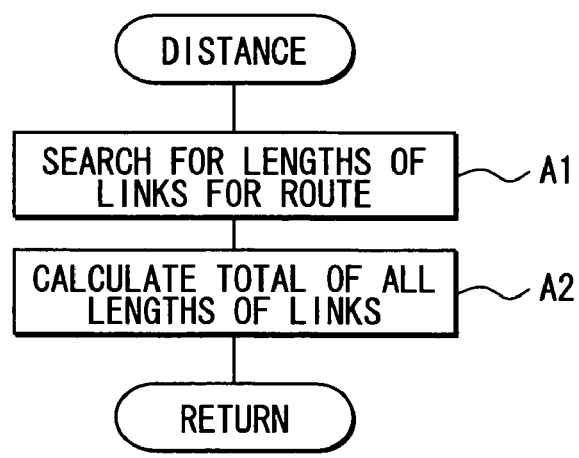
FIG. 11 is a flow chart illustrating exemplary calculation of a distance of the searched route.

The control device 2 calculates the distance, the required time, and the turnpike toll for each of the routes. As shown in the flow chart in FIG. 11, the control device 2, which can function as the distance calculating means, searches for the link lengths of multiple links which constitute the route or each of the routes at A1. Then, the control device 2 calculates the distance by calculating a total of the above multiple link lengths at A2. Typically, the required time is calculated using the distance of the route and the speed on the road type stored in the RAM, which can act as the storage means, of the control device 2, which can act as the required time calculating means.

Figure 12:
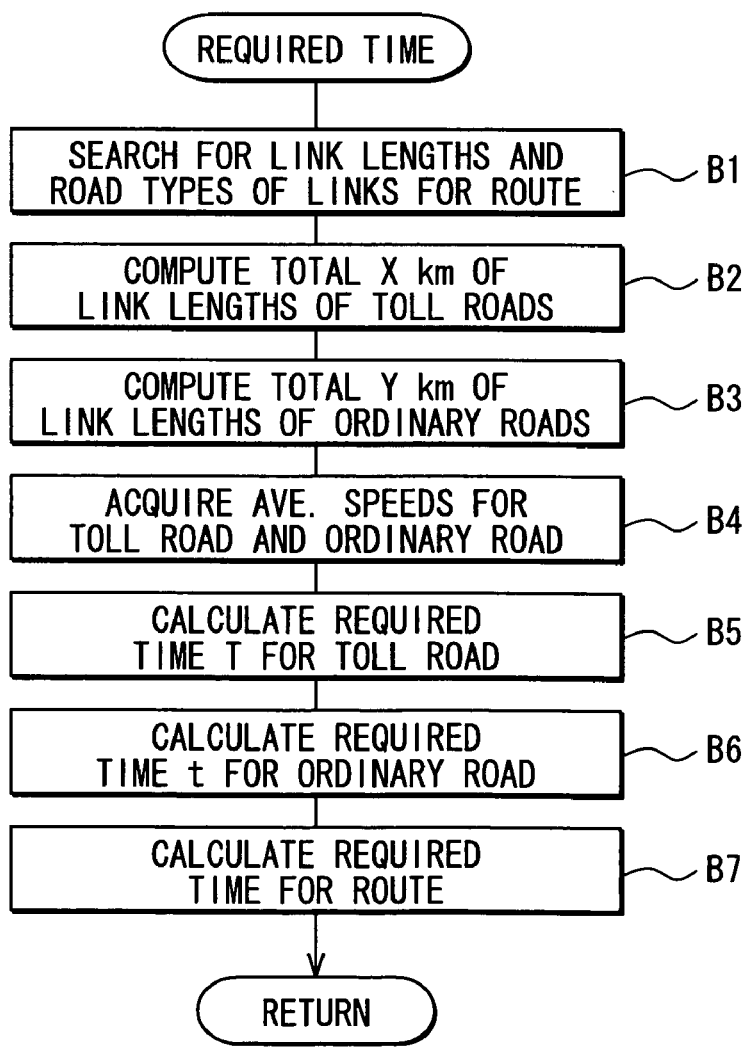
FIG. 12 is a flow chart illustrating exemplary calculation of a required time of the searched route.

That is, as shown in FIG. 12, firstly, the control device 2, which can act as the required time calculating means, searches for the link lengths of two or more links which constitute the route, and the road type of the link for each of the routes at B1. Then, the control device 2 computes a total, such as X Km, of the link lengths of the toll road in the route at B2 and computes a total, such as Y Km, of the link lengths of the ordinary road in the route at B3. Then, the control device 2 acquires the average speed of the vehicle on the toll road and the average speed of the vehicle on the ordinary-road at B4. Both the average speeds are prestored in the RAM. Then, the control device 2 divides the distance A of the toll road with the average speed on the toll road to calculate the required time T of the toll road at B5. Also, the control device 2 divides the distance B of the ordinary road by the average speed on the ordinary road to calculate the required time t of the ordinary road at B6. The required time of the concerned route is calculated by acquiring the total of the required times T, t of the toll road and of the ordinary road at B7.

Figure 13:
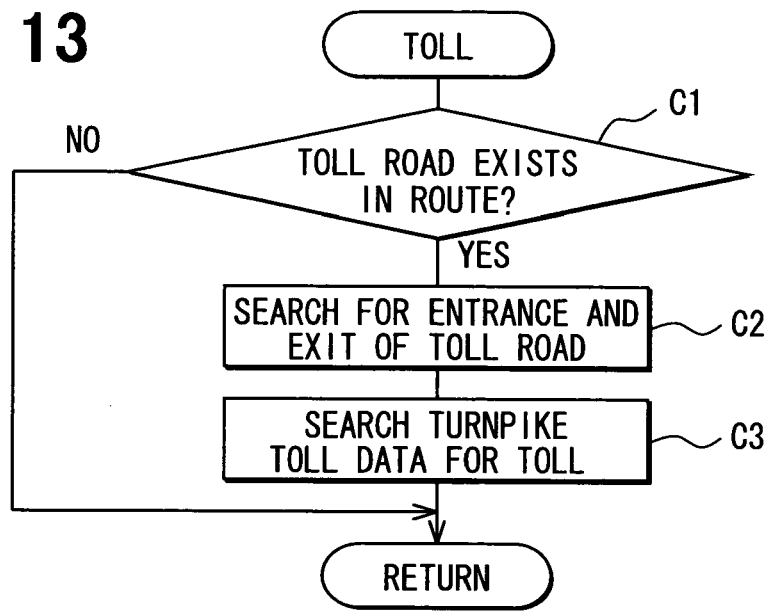
FIG. 13 is a flow chart illustrating exemplary obtaining of a fee of a searched toll road.

The turnpike toll is calculated by the control device 2, which can act as the turnpike toll calculating means, as shown in a flow chart in FIG. 13. That is, the control device 2 searches for the toll road for each of the routes at C1, and if the toll road is found, the control device 2 searches for the entrance and the exit of the found toll road at C2. Then, the control device 2 searches turnpike toll data stored in the information storage device 4 for the toll from the entrance to the exit (C3).

Figure 1:
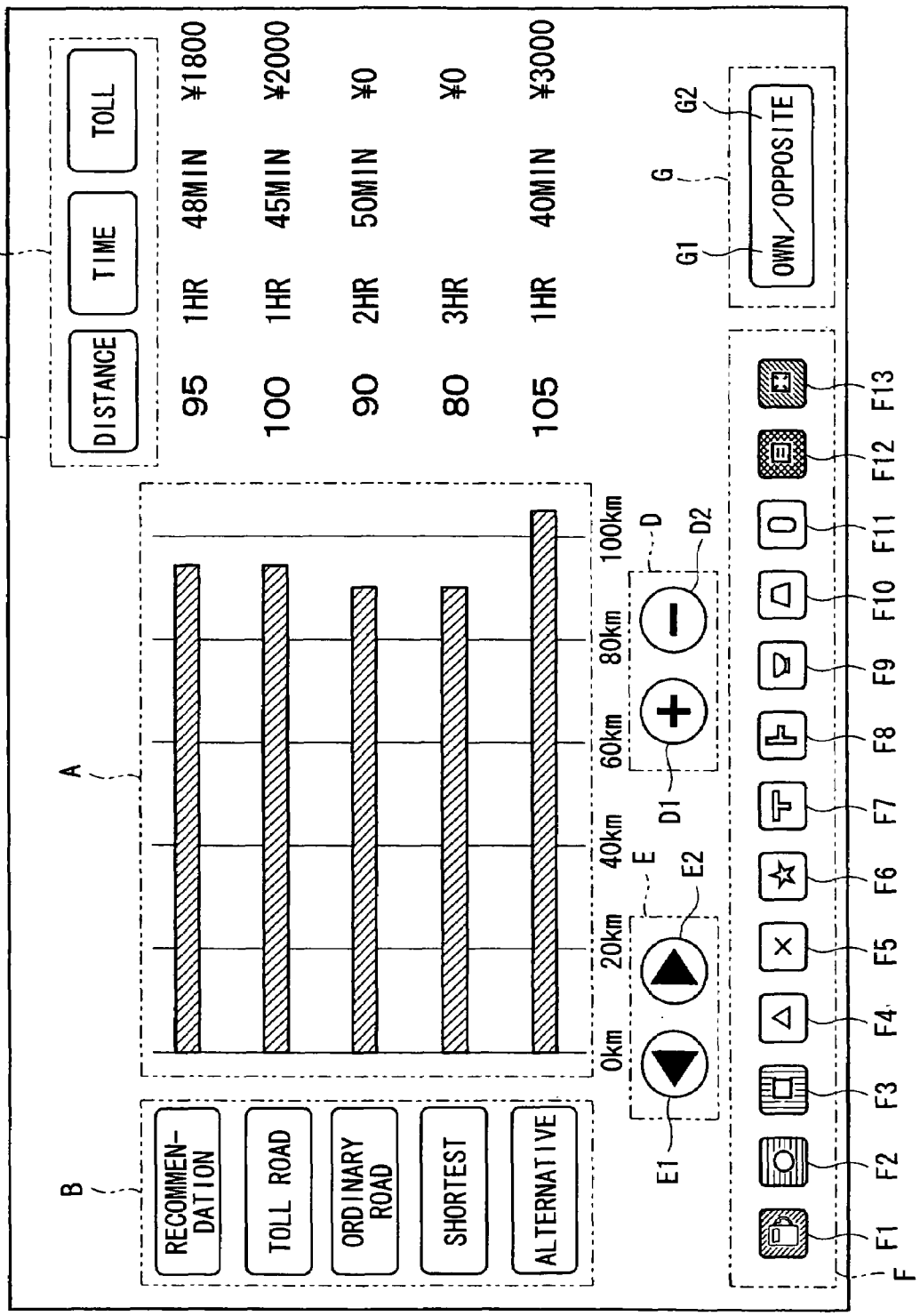
FIG. 1 is a diagram illustrating an initial state of a guidance route determination support screen of a vehicle navigation system according to one embodiment.
Figure 9:
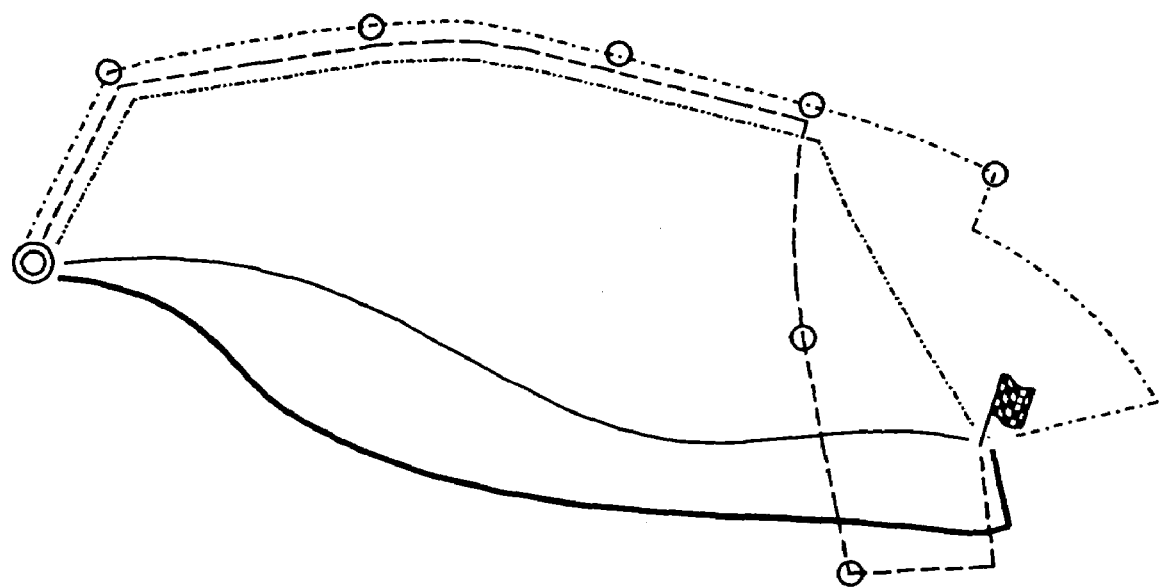
FIG. 9 is a diagram illustrating an example of searched multiple routes on a map.

When five routes are found as mentioned above, the control device 2 shows each of the routes on the map in the display screen of the display device 8 by different colors with each other as shown in FIG. 9, which can be performed by the searched route display controlling means. For convenience, the different colors are indicated by different line styles in FIG. 9. Then, the control device 2 changes the display of the display device 8 from the map display screen to the guidance route determination support screen. The guidance route determination support screen shows the variety of information items about the five found or searched. As shown in FIG. 1, the screen has a chart display portion A as a main display portion. The chart display portion A includes charts for all of the routes, and the chart is made by making the associated factor such as a distance, required time, turnpike toll, into a chart form at S6, which can be performed by the chart display controlling means.

FIG. 1 shows an initial state of the display screen changed from the map display screen to the guidance route determination support screen. As understood from FIG. 1, firstly, the distance of each route is made into the chart of the associated factor. In the present embodiment, the bar chart is employed as the chart form. In one of both sides of the chart display portion A, characters of "recommendation", "toll road", "ordinary road", "shortest", and "alternative", each of which indicates the type of route search, are displayed. When one of the displayed characters is touched, the touch sensitive panel 6 detects a touch position at S7 and S8. Then, the control device 2 determines that the route that corresponds to the touch position is confirmed as the guidance route at S9 and S10. The portion that includes the above characters of "recommendation", "toll road", "ordinary road", "shortest", and "alternative" is named as a guidance route determination operation portion B.

Figure 2:
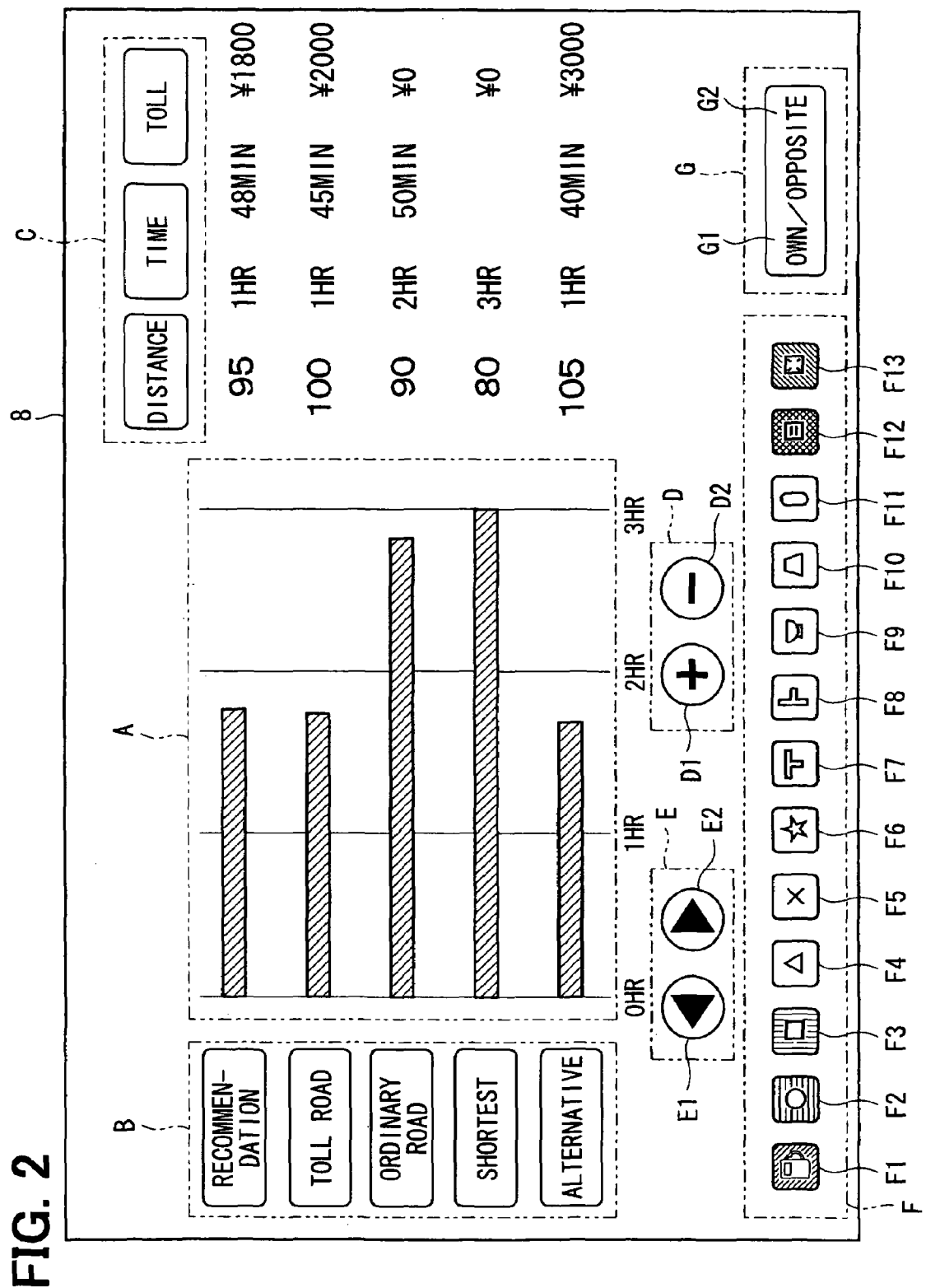
FIG. 2 is a diagram illustrating a required time as bar charts according to one embodiment.

In the other side of the sides of the chart display portion A, the distance, the required time, and the turnpike toll for each route are shown by numerical values. On the upper row of the region which numerically shows the distance, time, and toll of each route, element characters or factor characters of "distance", "time", and "toll", which are the item names of the values, are displayed. The portion showing "distance", "time", and "toll" is named as a chart element selection operation portion C. When one of the element characters is touched, the touch sensitive panel 6 detects a touch position at S7 and S8. The control device 2 replaces the currently shown bar charts of the distance in the chart display portion A with other bar charts that correspond to the touched element at S14, S15, which can function as the chart element changing means. FIG. 2 shows an example of the display screen in a case, where the required time is made into the bar charts after the "time" portion has been touched.

Figure 3:
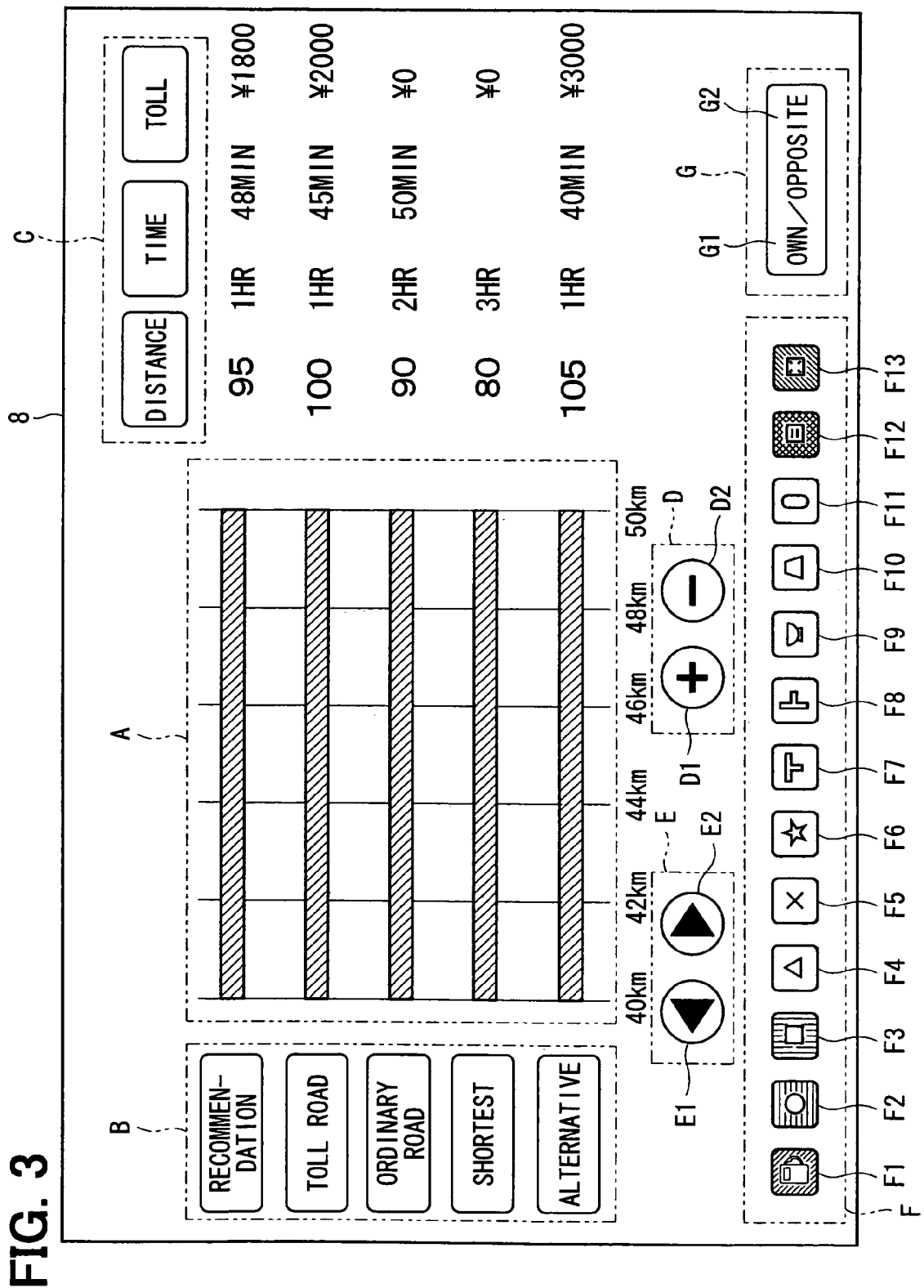
FIG. 3 is a diagram illustrating an example in which the bar charts of the distance are enlarged.

A display magnification changing part D and a scrolling operation portion E are provided in right and left of the lower side of the bar chart portion. By changing a unit length of the display scale mark of the bar chart, the display magnification changing part D enlarges and reduces the bar chart. When an expansion operation portion D1 of the display magnification changing part D is touched, the unit length of the display scale mark becomes longer by a predetermined magnification per one touch. When a reduction operation portion D2 of the display magnification changing part D is touched, the unit length of the display scale mark becomes shorter by the predetermined magnification per one touch as shown in S7, S8, S16, and S17, which can be performed by display magnification change means. FIG. 3 shows an enlarged bar chart of the distance. The enlargement and reduction of the bar chart at the time of operating the display magnification changing part D is made in a transverse direction relative to the center of the bar chart that is presently displayed in the screen.

Figure 4:
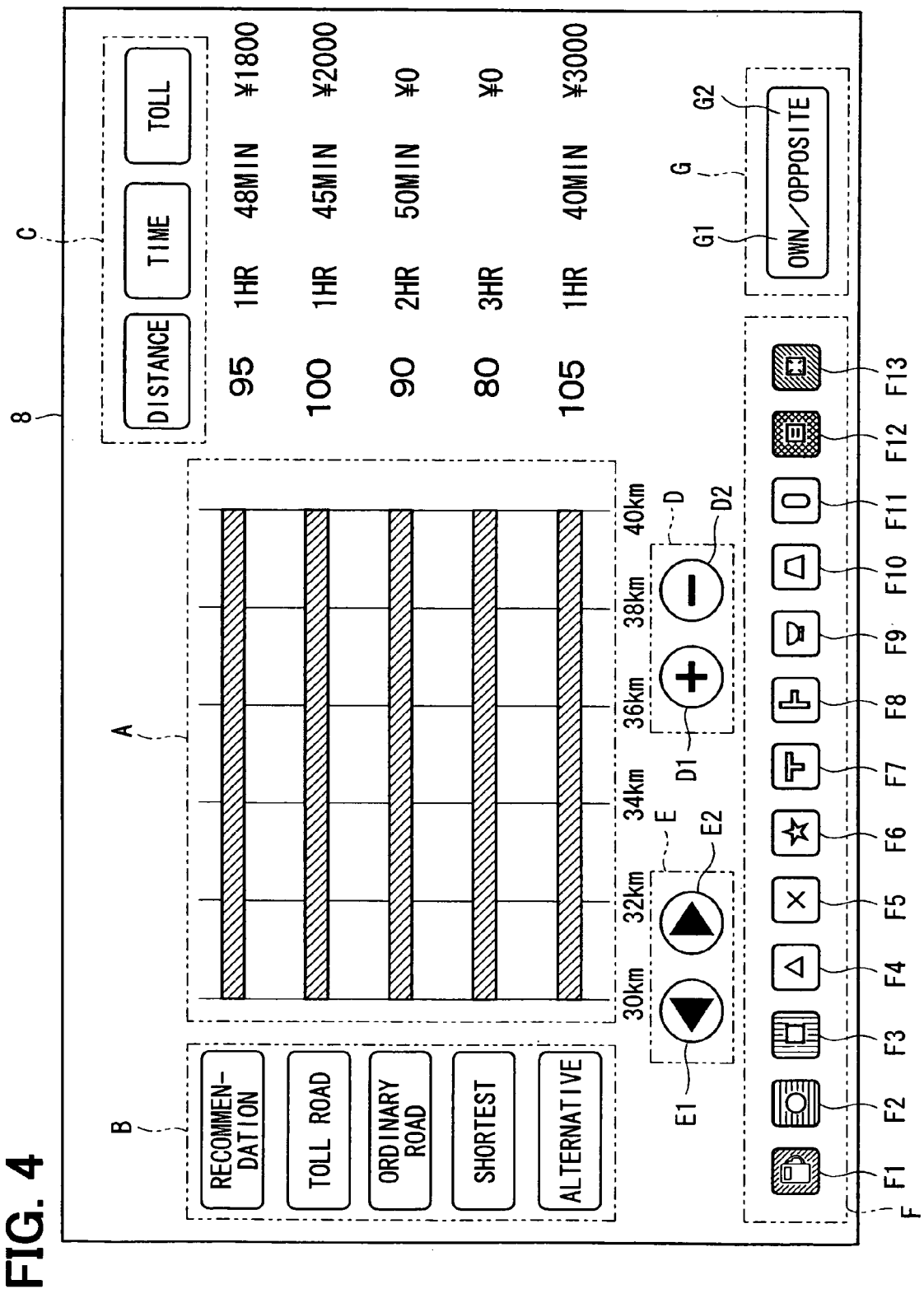
FIG. 4 is a diagram illustrating an example in which the bar charts are scrolled.

When the bar chart is enlarged as above, the bar chart may be partly displayed on the chart display portion A. Thus, the scrolling operation portion E is provided in order to displace the part of the bar chart partly displayed in the chart display portion A in a right direction and a left direction (transversely). The scrolling operation portion E includes a left scroll operation portion E1 and a right scroll operation portion E2. When the left scroll operation portion E1 is touched at S7 and S8, the touch sensitive panel 6 detects a touch position. Then, the control device 2 displaces the part of the bar chart displayed in the chart display portion A to a left side at S18 and S19. When the right scroll operation portion E2 is touched, the touch sensitive panel 6 detects a touch position at S7 and S8. Then, the control device 2 displaces the part of the bar chart displayed in the chart display portion A to a right side at S18 and S19, which can be performed by display position changing means. FIG. 4 shows the state where the bar chart has been scrolled rightward from the position shown in FIG. 3.

Figure 8:
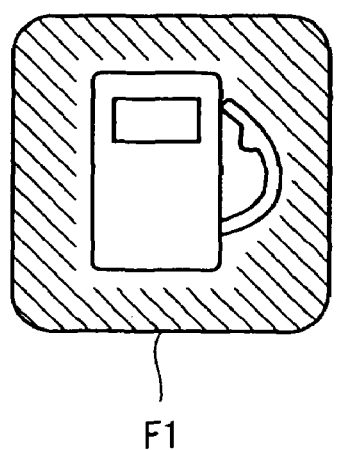
FIG. 8 is a diagram illustrating an example of a facility icon.

An icon display portion F is provided in the lowest portion of the guidance route determination support screen. The icon display portion F includes facility icons F1-F11, a toll road icon F12, and a traffic jam information icon F13 arranged transversely in the display. The facility icons F1 to F11 show multiply kinds of facilities, and the toll road icon F12 indicates a toll road. Also, the traffic jam information icon F13 indicates the traffic jam. The facility icons F1-F11 indicates facilities, such as a convenience store, a gasoline station, the post office, the restaurant or eating house. Each of the facility icons F1-F11 is indicated by a rectangular frame having a different color from each other and by a corresponding figure that indicates a facility, a toll road, and a traffic jam. The figure is shown inside the frame. FIG. 8 shows an example of the icon F1 of gasoline station. However, other icons F2 to F11 in other drawings show the figures or patterns that may not be used regularly.

In a state, where the bar charts of the distance of the searched route are being displayed on the chart display portion A, if an icon displayed on the icon display portion F is touched, the icon is located on the bar chart to show the position of the facility that corresponds to the touched icon on the bar chart. Also, if the display device changes the screen to display the bar charts of the distance after an icon displayed on the icon display portion F has been touched, the icons becomes located on the bar charts such that the position of the facility that corresponds to the touched icon is known on the bar chart. The bar chart of the distance of each searched route shows the searched route in a straight line for simplicity. The position of each point on the bar chart responds to the corresponding position along the searched route on the map. When the user touches the icon or performs the touch operation of the icon in the icon display portion F, the touch sensitive panel 6 detects the touch position, and sends the touch position to the control device 2 at S7 and S8. Then, the control device 2 detects the icon, which the user has selected, based on the touch position. Then, the control device 2 detects a position of the facility, the toll road, or the traffic jam, which corresponds to the selected icon, based on the position detection data, and the link information of the map data in the procedures at S20 to S22.

For example, when one of the facility icons F1-F11 corresponding to displayed facility selecting means is touched, the control device 2 searches the position detection data in the information storage device 4 to acquire the positions of the selected facility on the map correspondingly to the touched icon. Then, the control device 2 selects positions of facility that are located along each searched route among the above acquired positions of the facility, and the above operation can be performed by facility search means. That is, the control device 2 searches for the facility that is located on a position along the searched route on the map. Then, the facility along the searched route is indicated using the facility icon at a position on the bar chart of the distance correspondingly to the position of the facility on the map, and the above operation corresponds to facility display controlling means.

When the toll road icon F12 corresponding to display selecting means is touched, the control device 2 searches the link information for the position of the toll road in each searched route, which operation can be performed by toll road detection means. Then, the control device 2 superimposes the icon on the bar chart of the distance such that the position of the detected toll road is shown, and the above operation corresponds to toll road display controlling means. When the traffic jam information icon F13 corresponding to display selecting means is touched, the control device 2 detects a position of the traffic jam on the map based on the road information, which the VICS receiver 10 received. When the position of the traffic jam or the traffic jam occurrence position is located on each searched route, the positions are indicated on the bar chart by the traffic jam icons, and the above operation corresponds to traffic jam display controlling means.

Figure 5:
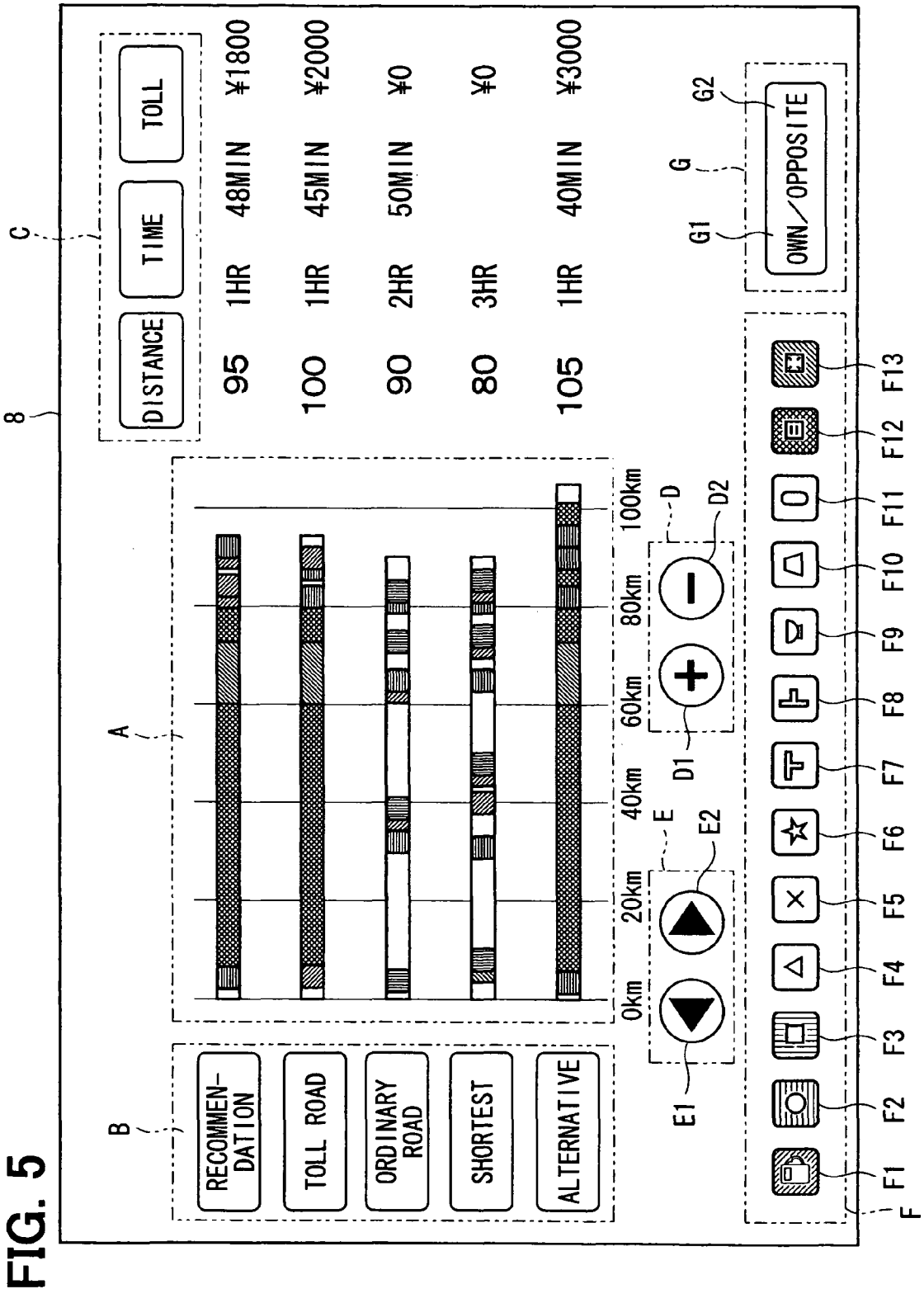
FIG. 5 is a diagram illustrating an example in which icons are shown on the bar charts.

Thus, when the icon is displayed on the bar chart of the distance of the searched route, the width of the facility icons F1-F11 are reduced and the figures on the icons are not shown. As a result, each of the facility icons F1-F11 is displayed as the rectangular frame of the base color. When many facility icons are displayed side by side closely to each other, it is difficult to clearly tell which facility icon is displayed. FIG. 5 shows an example, in which multiple icons are displayed on the bar chart of the distance.

Figure 6:
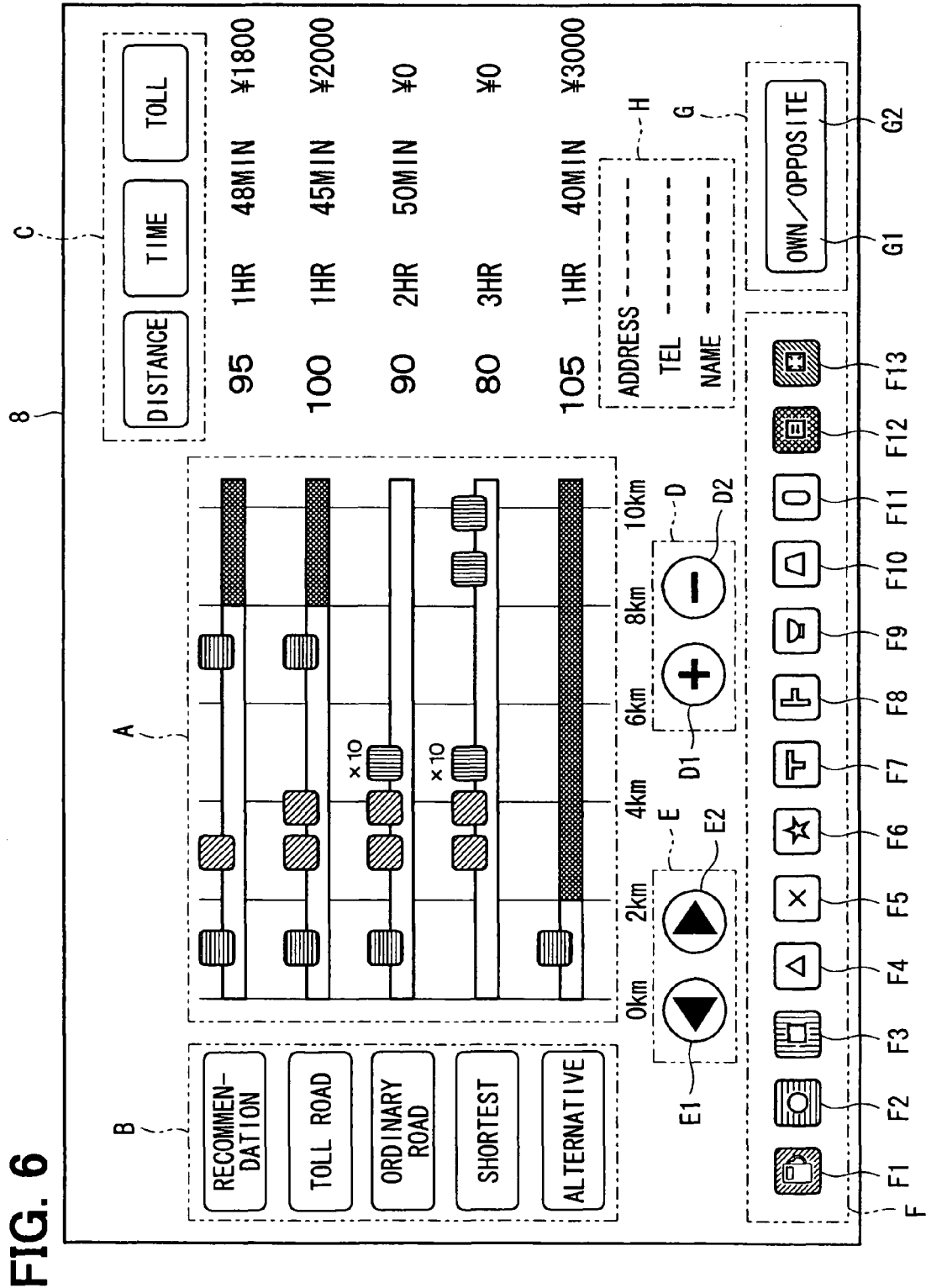
FIG. 6 is a diagram illustrating an example in which the bar charts of the distance and the icons are enlarged, and in which the charts and icons have been scrolled.

In the above case, when the expansion operation portion D1 of the display magnification changing part D is touched to enlarge the bar chart, the facility icon is also enlarged. Consequently, it is possible to know in detail which facility icon is displayed. FIG. 6 shows an example, in which the bar chart of distance is enlarged. Even in the enlarged bar chart, because many similar facilities are located close to each other, each of the facilities may not be displayed separately. That is, for example, facilities more than a predetermined number may be located within a predetermined distance. In the above case, an indication (e.g., "×10") is superimposed on the facility icon such that it is known there are located ten of the facilities of the kind.

A road lane selecting part G is displayed next to the icon display portion F. In general, the facilities exist on both sides of a road, and the lane selecting part G is used to select the display manners for displaying the above facilities on the bar chart of distance. For example, one of the display manners is displaying only facilities located along the lane (own lane or first lane), on which the vehicle travels. Also, the other one of the display manners is displaying both facilities located along both of the lanes, that is, own lane and opposite lane. Here, vehicles on the opposite lane or on the second lane run in an opposite direction opposite to the travel direction of the vehicle running on the own lane. Because the vehicle is to travel on the searched route toward the destination from the original position, the running direction of the vehicle in each searched route is detectable, which operation corresponds to travel direction detection means. As a result, when the position of the facility on the map has been detected, it is also detected whether the position of the facility is located along the own lane or the opposite lane.

If a own lane selecting part G1 of the lane selecting part G is touched, the control device 2 determines that selection has been made to display only the facilities along the own lane based on the touch position detection signal sent from the touch sensitive panel 6 at S7 and S8. Then, the facilities along the own lane are superimposed or displayed on the bar chart in the procedures at S20-S22. If the opposite lane selecting part G2 of the lane selecting part G is touched, the control device 2 determines that selection has been made to display the facilities along the own lane and the opposite lane based on the touch position detection signal sent from the touch sensitive panel 6. As a result, the control device 2 displays the facilities along the own lane and the opposite lane on the bar chart in the procedures at S20-S22.

When a facility icon displayed on the bar chart is touched, the details of the facility can be known. That is, when the facility icon on the bar chart is touched, the touch sensitive panel 6 detects the touch position and send a signal indicative of the touch position to the control device 2 at S7 and S8, which operation corresponds to displayed icon selecting means. Then, the control device 2 specifies the facility based on the touch position and searches the position detection data in the information storage device 4 for detailed information about the specified facility. Then, the control device 2, for example, causes the display device 8 to display the detailed information, such as address, telephone number, a facility name, in an area H of the display screen of the display device 8 as shown in FIG. 6 in the procedures at S23-S25, which operation corresponds to detailed information acquiring means and detailed information display controlling means.

Figure 7:
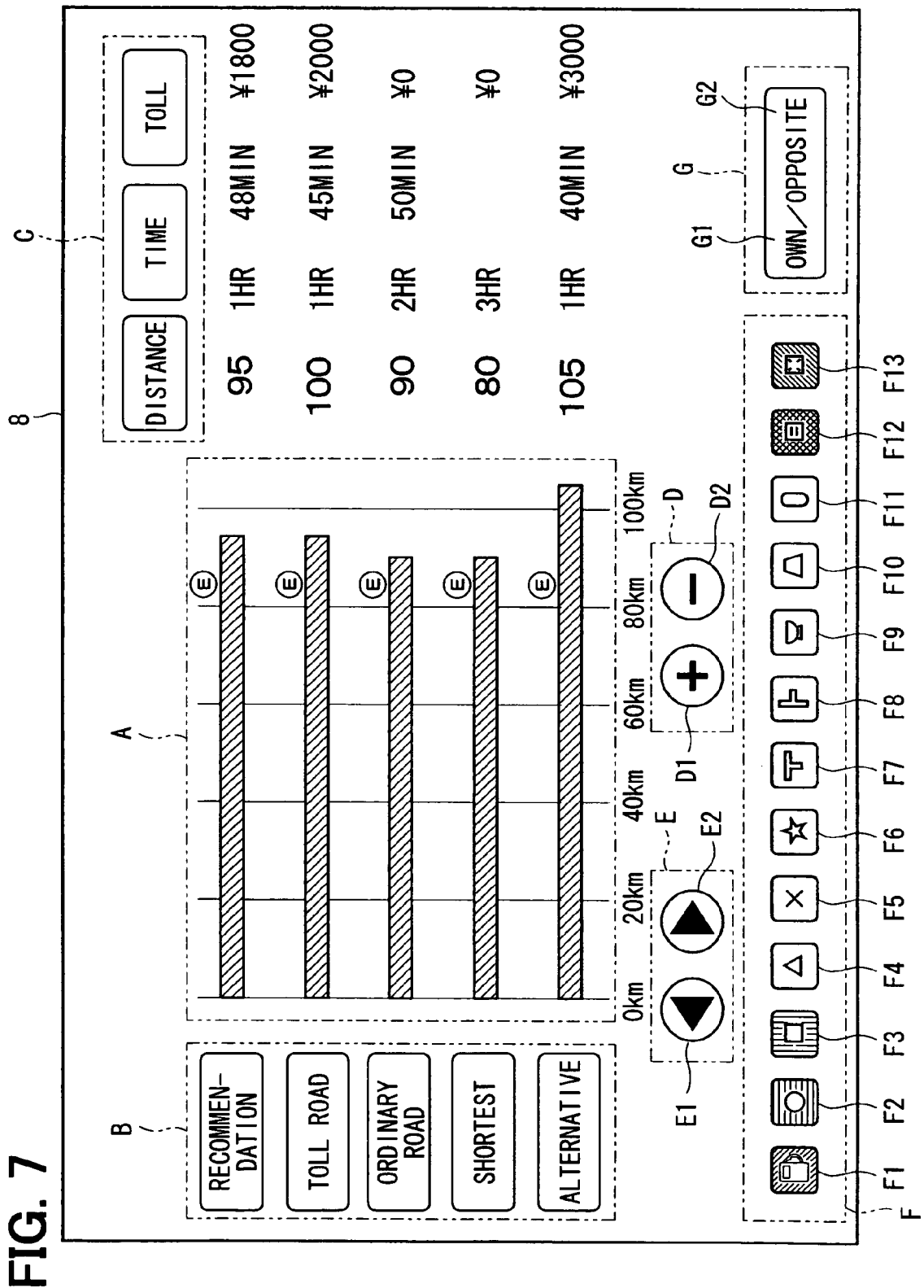
FIG. 7 is a diagram illustrating the initial state of the guidance route determination support screen according to the one embodiment, in which a maximum distance made possible with the remaining fuel is shown.
Figure 14:
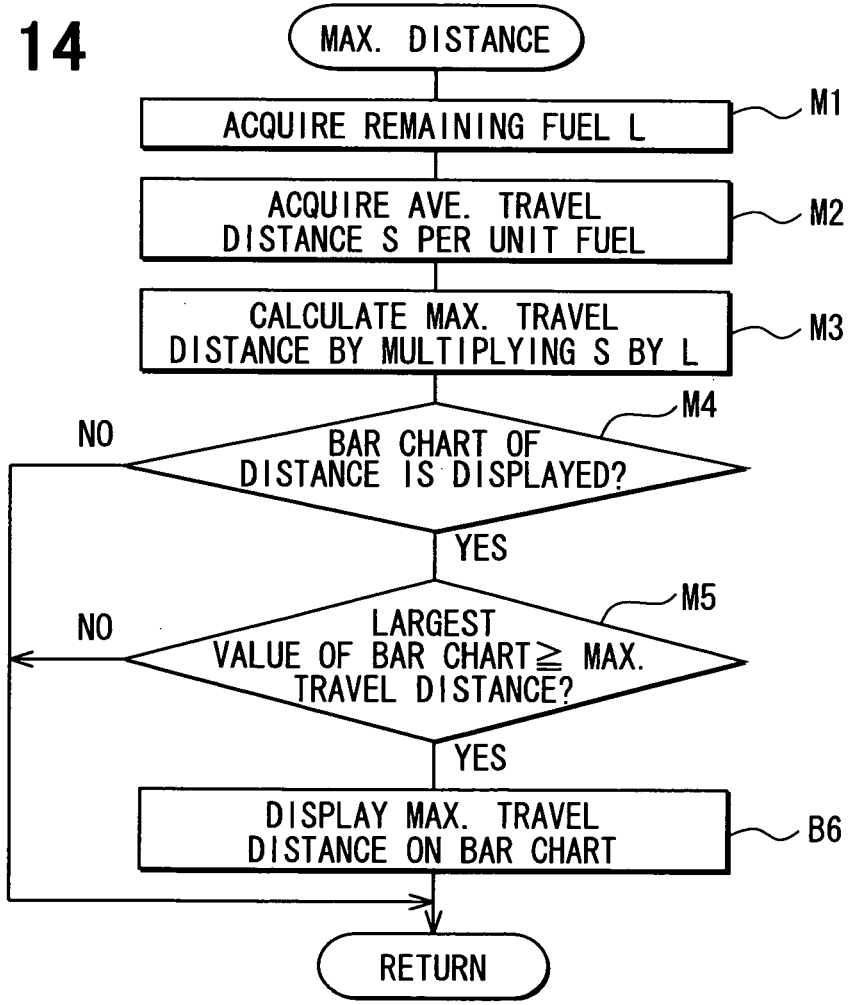
FIG. 14 is a flow chart illustrating exemplary calculation of a maximum distance, which a vehicle can run with a remained fuel.

In the present embodiment, when the bar chart of distance is displayed, the control device 2 displays a distance or a maximum distance, which the vehicle can run with the remaining fuel in the tank, on the bar chart. That is, as shown in FIG. 15, the control device 2 is connected with a remaining fuel sensor 19 corresponding to residual fuel detection means for detecting the remaining fuel in the fuel tank (not shown) and the control device 2 can acquire the information of the remaining fuel through the sensor 19. When the selection is made to display the distance of the searched route in the form of the bar chart, the control device 2 acquires the remaining fuel L and the average travel distance S per unit fuel quantity prestored in the RAM as shown in a flow chart in FIG. 14 at M1 and M2. The remaining fuel L is multiplied by the average travel distance S per unit fuel quantity to compute a maximum travel distance at M3, which can be performed by maximum travel distance acquiring means. The maximum distance is displayed on the bar chart of distance of each searched route, corresponding to YES" at M4, M5, and M6, which operation can be performed by distance display controlling means. FIG. 7 shows an example, in which the maximum distance is indicated by a mark having a letter of E surrounded by O. The maximum distance is not displayed when the maximum distance exceeds a largest value of the bar chart of distance that is presently displayed in the chart display portion A corresponding to "NO" at M5.

As above, multiple routes to the destination are searched for, and the guidance route determination support screen is displayed. In the above case, the user checks the distance, the required time, and the turnpike toll of each searched route using the length of the bar chart in the screen and mutually compares the searched routes. Also, the user checks the positions of the facilities or the toll roads and the existence of the traffic jam on each route by touching the corresponding icons in the icon display portion F. Also, the user checks whether the vehicle can reach the destination by the presently remaining fuel.

Then, the user selects one route among the searched routes such that the one route serves as the guidance route. The above selection is made by touching the character portion corresponding to each searched route in the guidance route determination operation portion B ("YES" at S7). Then, as discussed above, the touch sensitive panel 6 detects the touch position and sends information indicative of the touch position to the control device 2 (S8). The control device 2 detects the route, which has been determined as the guidance route, based on the touch position information (S9, S10). Then, the control device 2 replaces the guidance route determination support screen with the map display screen in the display device 8. Then, the control device 2 highlights the guidance route on the map (S11). Then, input means (e.g., the touch sensitive panel 6) is operated to start the guidance operation ("YES" at S12). The control device 2 proceeds control to the route guidance, in which the travel direction of the vehicle along the above guidance route is guided (S13).

According to the present embodiment, the distance, the required time, and the turnpike toll of each of the multiple searched routes are displayed as the bar chart as above. As a result, it is easy to visually compare the magnitude of the distance, the required time, or the turnpike toll. Also, it is easy to visually check whether there is the target facility, which the user needs, along each searched route, or whether there is any traffic jam along each searched route. As a result, in a case, where the guidance route is to be selected among two or more searched routes, decision that sufficiently satisfies the demand of the user can be made.

The present invention is not limited to the above description and drawings. However, the present invention can be expanded or modified as below.

In the guidance route determination support screen, only one of the distance, the required time, and the turnpike toll of each searched route may be made into the bar chart, for example.

The bar chart may extend vertically (in a up-down direction) instead of extending horizontally (in a left-right direction).

The chart may be a line chart which connects the points indicative of the distance (or the required time, turnpike toll) of each searched route. For example, the facility that exists in each searched route can be displayed in the line chart such that an approximate location of the facility in each route can be shown.

Additional advantages and modifications will readily occur to those skilled in the art. The invention in its broader terms is therefore not limited to the specific details, representative apparatus, and illustrative examples shown and described.

What is claimed is:

1. A navigation system for a vehicle for generating a plurality of routes from a present position of the vehicle to a destination, the navigation system comprising:
    present position acquiring means for acquiring the present position;
    information storage means for storing map data of a map and storing position detection data including a relation between a type of each of various facilities and a facility position of the each of the various facilities on the map;
    display means for displaying the map based on the map data;
    factor chart display controlling means for associating one or more factors with each of the plurality of routes and forming a factor bar chart of the route and the associated one or more factors, the factor chart display controlling means for causing the display means to display the factor bar chart of the associated one or more factors of the each of the plurality of routes;
    facility search means for searching for at least one facility located along the each of the plurality of routes based on the position detection data;
    facility display controlling means for causing the display means to display the at least one facility for the each of the plurality of routes together with the factor bar chart of the associated one or more factor; and
    displayed facility selecting means for selecting a type of the at least one facility that is displayed by the display means, wherein:
    the display means displays the at least one facility while the display means displays the factor bar chart of a distance of the each of the plurality of routes; and
    the display means displays the at least one facility at a position on the factor bar chart of the distance, the position corresponding to the facility position of the at least one facility along the each of the plurality of routes.

2. The navigation system according to claim 1, the navigation system further comprising:
    travel direction detection means for detecting a travel direction of the vehicle based on the present position acquired by the present position acquiring means, wherein:
    the at least one facility includes a first facility that is located along an first lane, on which the vehicle travels, and a second facility that is located along a second lane opposite to the first lane;
    the facility search means searches for the first facility located along the first lane and the second facility located along the second lane based on the travel direction detected by the travel direction detection means; and
    the facility display controlling means is adapted for selecting a first case and a second case, wherein the first facility is displayed in the first case and the first and second facilities are displayed in the second case.

3. The navigation system according to claim 1, wherein the display means displays the at least one facility using an icon that indicates the at least one facility.

4. The navigation system according to claim 1, wherein the factor bar chart of the distance in the display means is enlarged and reduced to change a length of a unit distance displayed in the display means.

5. The navigation system according to claim 1, wherein:
    the display means displays the at least one facility using an icon that indicates the at least one facility;
    the factor bar chart of a distance in the display means is enlarged and reduced to change a length of a unit distance displayed in the display means; and
    the icon of the at least one facility is enlarged and reduced in accordance with the change of the length of the unit distance.

6. The navigation system according to claim 4, wherein the factor bar chart of the distance is scrollable in a case, where the factor bar chart is enlarged.

7. The navigation system according to claim 3, further comprising:
    displayed icon selecting means to allow a selection of the icon of the at least one facility on the factor bar chart associated with a distance;
    detailed information acquiring means for acquiring, from the position detection data, detailed information of the at least one facility that corresponds to the selected icon; and
    detailed information display controlling means for causing the display means to display the detailed information acquired by the detailed information acquiring means.

8. The navigation system according to claim 1, further comprising:
    toll road detection means for detecting a toll road on the each of the plurality of routes;
    toll road display controlling means for causing the toll road detected by the toll road detection means to be displayed, wherein:
    when the associated one or more factors of the factor bar chart is a distance and when the display means displays the factor bar chart, the toll road display controlling means causes the display means to display an indication of the toll road at a position on the factor bar chart of the distance corresponding to a position of the toll road along the each of the plurality of routes.

9. The navigation system according to claim 1, wherein:
    road information acquiring means for acquiring traffic jam information; and
    traffic jam display controlling means for causing the display means to display an indication of an occurrence of the traffic jam for the each of the plurality of routes based on the traffic jam information acquired by the road information acquiring means.

10. The navigation system according to claim 9, wherein:
when a distance of the each of the plurality of routes is made into the factor bar chart and when the display means displays the factor bar chart, the display means displays an indication of the traffic jam at a position on the factor bar chart, the position corresponding to a position of the traffic jam along the each of the plurality of routes.

11. The navigation system according to claim 1, wherein:
the associated factor is a distance, the navigation system further comprising:
maximum travel distance acquiring means for acquiring a maximum distance that the vehicle runs; and
distance display controlling means for causing the display means to display an indication of the maximum distance at a distance-related position on the factor bar chart, the position corresponding to the maximum distance on a scale of the factor bar chart.

12. The navigation system according to claim 11, wherein:
the maximum travel distance acquiring means acquires a remaining fuel quantity that the vehicle has and a travel distance per unit fuel quantity; and
the maximum travel distance acquiring means computes the maximum distance by multiplying the remaining fuel quantity by the travel distance per unit fuel quantity.

13. The navigation system according to claim 1, wherein:
the at least one facility includes a plurality of facilities; and
when a number of the plurality of facilities located within a predetermined distance is more than a predetermined number, the display means displays an indication, which indicates the number of the plurality of facilities, on an icon that indicates the plurality of facilities.

14. The navigation system according to claim 1, wherein:
the plurality of routes include a recommendation route, a most-use-of-tollroad route, a most-use-of-ordinary-street route, and a shortest distance route.

* * * * *